(12) United States Patent
Deguchi

(10) Patent No.: US 7,342,384 B2
(45) Date of Patent: Mar. 11, 2008

(54) SWITCHING REGULATOR

(75) Inventor: Michiyasu Deguchi, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 11/649,973

(22) Filed: Jan. 5, 2007

(65) Prior Publication Data
US 2007/0182397 A1    Aug. 9, 2007

(30) Foreign Application Priority Data
Jan. 12, 2006    (JP) .............................. 2006-004640

(51) Int. Cl.
*G05F 1/40* (2006.01)
(52) U.S. Cl. ...................... 323/266; 323/272
(58) Field of Classification Search ................ 323/272, 323/266, 283, 284, 224
See application file for complete search history.

(56) References Cited

U.S. PATENT DOCUMENTS
6,806,692 B2 * 10/2004 Lee ............................ 323/277

OTHER PUBLICATIONS
LINEAR Technology, "1.5 MHz, 600 mA Synchronous Step-Down Regulator with Bypass Transistor," 2003.

* cited by examiner

*Primary Examiner*—Shawn Riley
(74) *Attorney, Agent, or Firm*—Brinks Hofer Gilson & Lione

(57) ABSTRACT

In a switching regulator circuit having a function of bypassing a power supply and an output terminal, there is provided a switching regulator that obtains a stable output voltage even if the operation of the bypass function is changed over. A reference voltage that is inputted to an error amplifier is set to a higher voltage value in a bypass state, and is gradually decreased to a desired value when the bypass state is canceled.

4 Claims, 2 Drawing Sheets

SWITCHING REGULATOR

This application claims priority under 35 U.S.C. §119 to Japanese Patent Application No. JP2006-004640 filed Jan. 12, 2006, the entire content of which is hereby incorporated by reference.

BACKGROUND OF THE INVENTION

1. Field of the Invention

The present invention relates to a switching regulator, and more particularly, to a switching regulator having a bypass switch which employs a circuit system that stably shifts from a bypass state to a normal state.

2. Description of the Related Art

A step-down switching regulator has been employed in every device since the step-down switching regulator is small in loss as compared with a series regulator. In recent years, particularly, the step-down switching regulator is frequently applied to mobile equipments such as cellular phones.

In particular, a power supply for driving an RF transmission amplifier of a cellular phone is greatly different in an electric power that is required by the RF transmission amplifier between a communication state and a non-communication state and also between a voice communication state and a data communication state. For that reason, when the power supply is brought to a state where the maximum electric power that is required by the RF transmission amplifier can be always supplied, the power supply capability when no maximum electric power is required is excessive with the result that the loss of the power supply increases. Because the cellular phone is driven by a battery, the increase in the loss of the power supply falls short of the needs of the market for a better cellular phone with a longer life battery.

Accordingly, it is necessary that the power supply for driving the RF transmission amplifier of the cellular phone can switch over the available electric power. As the power supply having a switchable electric power, there has been known a power supply using a chopper type step-down switching regulator (hereinafter, referred to as "step-down switching regulator") (see Linear Technology Corp., LTC3408 data sheet).

FIG. 3 is a block diagram showing a conventional step-down switching regulator. The power supply of the step-down switching regulator can be switched over by making the output voltage Vout variable. When the required electric energy is larger, the output voltage Vout is increased, and when the required electric energy is smaller, the output voltage Vout is decreased.

The conventional step-down switching regulator is equipped with a bypass transistor 104 that is a bypass switch which short-circuits a series resistor consisting of a MOS transistor 100 and an inductor 102. Also, the conventional step-down switching regulator controls a voltage of a reference voltage circuit 109 by the aid of a change-over comparator 108, to thereby render the bypass transistor 104 conductive when a large electric energy is required. As a result, Vin and Vout are short-circuited to make the output voltage Vout variable.

In this situation, an on-resistance of the bypass transistor 104 is made remarkably smaller than an on-resistance of the MOS transistor 100 to suppress the power loss.

However, in the conventional step-down switching regulator shown in FIG. 3, in a case where a change rate of the reference voltage circuit 109 is high, there arises such a problem that an overshoot or an undershoot occurs in an output voltage of the Vout terminal as shown in FIG. 4, and the output voltage is not stabilized.

SUMMARY OF THE INVENTION

The present invention has been made to solve the above-mentioned problem, and therefore an object of the present invention is to provide a step-down switching regulator that obtains a stable output voltage.

To achieve the above-mentioned object, according to the present invention, there is provided a step-down switching regulator including a second reference voltage circuit that generates a reference voltage that is higher than that of a first reference voltage circuit, and a selector circuit that switches over the reference voltage that is inputted to the error amplifier, in which the second reference voltage is inputted to the error amplifier in a bypass mode. In addition, the selector circuit switches over from the second reference voltage to the first reference voltage with a sufficient time (several hundreds µs) in order to solve the above-mentioned problem.

As described above, according to the switching regulator circuit of the present invention, an overshoot or an undershoot which occurs at an output terminal is suppressed when the switching regulator circuit shifts between a bypass mode and a normal mode, thereby making it possible to obtain a stable output voltage.

DETAILED DESCRIPTION OF THE PREFERRED EMBODIMENTS

Now, a description will be given of the embodiment of the present invention with reference to the accompanying drawings.

Figure 1:
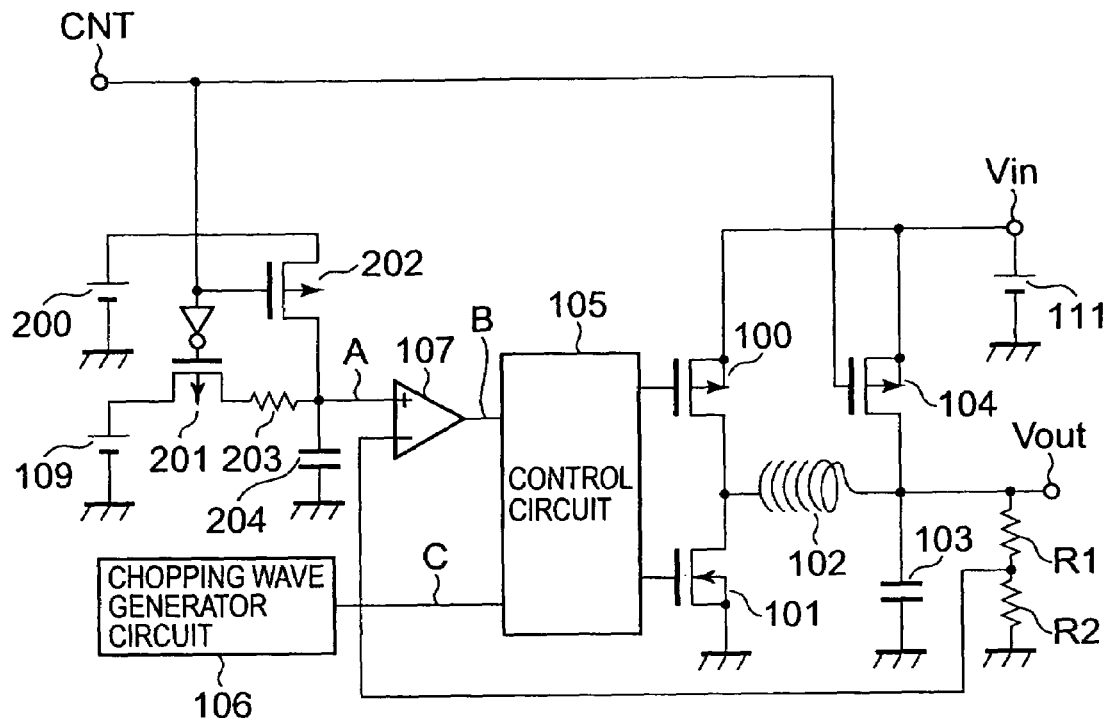
FIG. 1 is a circuit diagram showing a step-down switching regulator according to an embodiment of the present invention.
Figure 2:
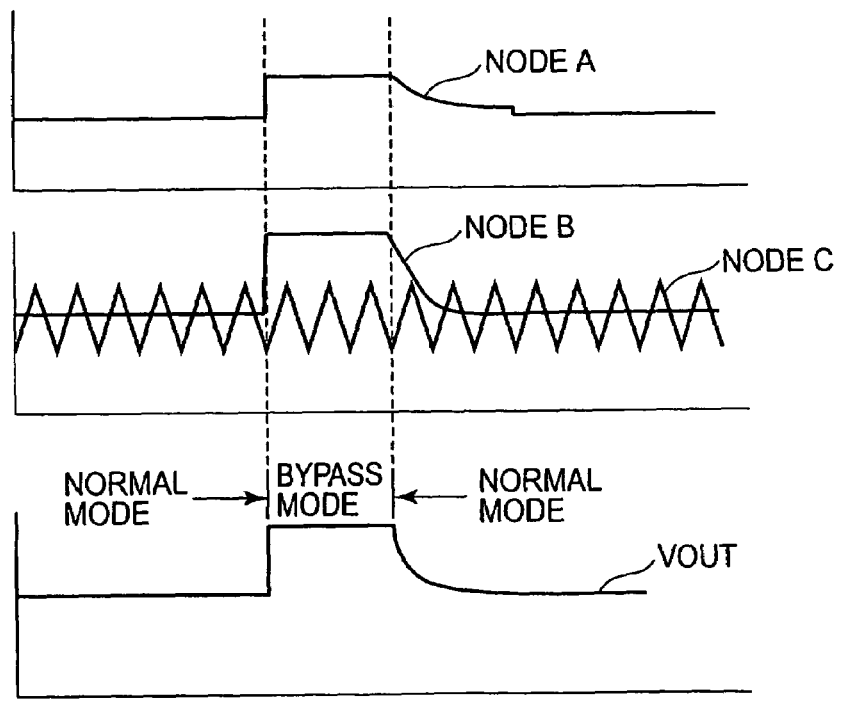
FIG. 2 is a diagram showing a voltage waveform of the step-down switching regulator according to the present invention.

FIG. 1 is a circuit diagram showing a step-down switching regulator according to an embodiment of the present invention.

The step-down switching regulator includes bleeder resistors R1 and R2 that divide an output terminal VOUT of the switching regulator, an error amplifier 107 that compares a divided voltage with a reference voltage, a control circuit 105 that outputs a PWM signal from an output of the error amplifier 107 and an output of a chopping wave generator circuit 106, output transistors 100 and 101 which are switched over in response to the PWM signal, an inductor 102 and a capacitor 103 which constitute an output smoothing circuit, and a bypass transistor 104 that is a bypass switch that bypasses an output terminal and a supply voltage.

The step-down switching regulator according to the present invention includes a first reference voltage circuit 109 that outputs a normal reference voltage as a reference voltage that is inputted to the error amplifier 107, and a second reference voltage circuit 200 that outputs a reference voltage that is higher than the first reference voltage, and changes over the first reference voltage and the second reference voltage in synchronism with a control signal of the bypass transistor 104.

In addition, the step-down switching regulator according to the present invention includes a time constant circuit that is made up of a resistor 203 and a capacitor 204, which is so structured as to change over from the second reference voltage to the first reference voltage with a given time.

Figure 3:
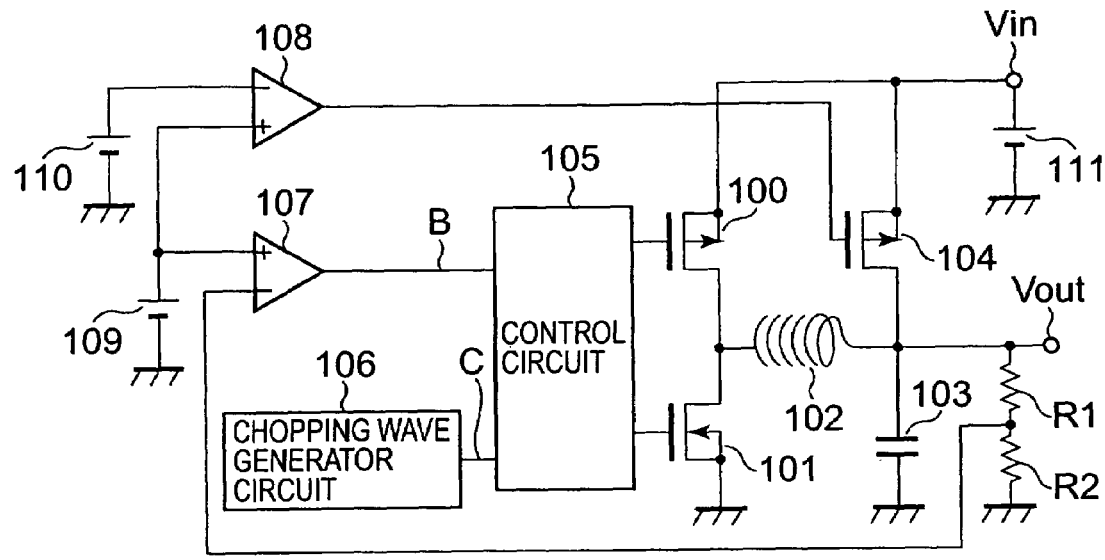
FIG. 3 is a circuit diagram showing a conventional step-down switching regulator.
Figure 4:
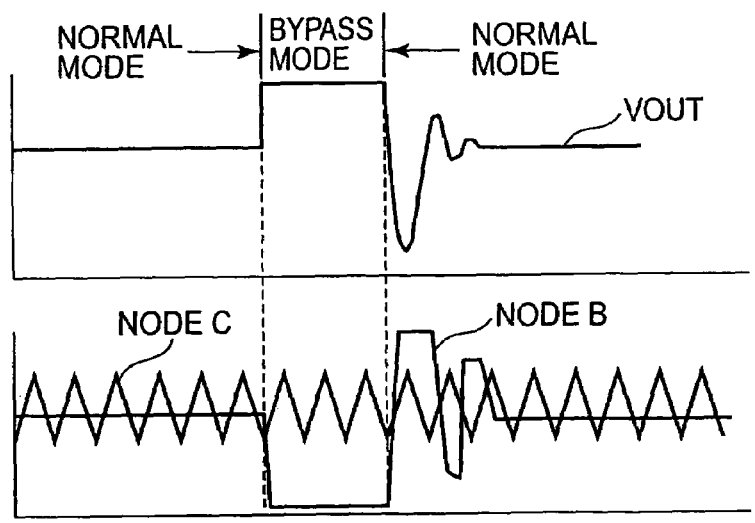
FIG. 4 is a diagram showing a voltage waveform of the conventional step-down switching regulator.

The control of the bypass transistor 104 may be conducted in response to a digital signal that is inputted from the external, or a signal that is obtained from the comparison result of the comparator circuit 108 as shown in FIG. 3.

Subsequently, the operation of the circuit will be described. The error amplifier 107 amplifies a potential difference that is developed between a non-inverting input terminal and an inverting input terminal thereof. The control circuit 105 outputs a control signal of the MOS transistors 100 and 101 from the output signal of the error amplifier 107 and the chopping wave of a chopping wave oscillator 202. The MOS transistor 100 is controlled so that the voltage value of the output terminal VOUT becomes a desired value, and an energy is supplied to the output terminal VOUT when the MOS transistor 100 is in a conductive state, whereas the energy is not supplied to the output terminal VOUT when the MOS transistor 100 is in a non-conductive state. Therefore, the voltage waveform of a node 215 is pulsed.

The pulse waveform of the node 215 is averaged by the smoothing circuit that is made up of the inductor 102 and the capacitor 103, and is then outputted to the output terminal VOUT. The MOS transistor 101 is an element that is rendered conductive when the MOS transistor 100 is in the non-conductive state, and is actuated so as to prevent a path through which a current flows in the inductor 102 from being shut out.

The output voltage of the output terminal VOUT is divided by the bleeder resistors R1 and R2, and is then inputted to the inverting input terminal of the error amplifier 107. The reference voltage that is inputted to the non-inverting input terminal of the error amplifier 107 is switched over by the aid of the transistors 203 and 204 which are switch means controlled in response to a bypass signal for controlling the bypass transistor 104.

In the switching regulator, the transistor 203 is in the conductive state when the bypass transistor 104 is in a normal state that is the non-conductive state, and a first reference voltage is inputted to the non-inverting terminal of the error amplifier 107. Therefore, the output voltage is controlled by the control circuit 105 so that the voltage resulting from dividing the output voltage is identical with the first reference voltage.

Then, a description will be given of a bypass state in the case of requiring the drive capability of the output terminal. In this situation, the bypass transistor 104 is rendered conductive in response to an external digital signal, and the output terminal VOUT and a power supply 111 are short-circuited. In this situation, since the transistors 203 and 204 are controlled in response to the same signal as that of the bypass transistor 104, the transistor 203 is rendered non-conductive, and the transistor 204 is rendered conductive. Therefore, the non-inverting terminal of the error amplifier 107 is inputted with the second reference voltage. In this situation, the voltage of the second reference voltage is set to a value that is higher than the voltage resulting from dividing the supply voltage, and performs a control so that the MOS transistor 100 is rendered conductive and the MOS transistor 101 is rendered non-conductive in the bypass state. Also, a voltage at both ends of the capacitor 204 is held as the second reference voltage.

Subsequently, a description will be given of the operation performed at the time of returning from the bypass state to the normal state. The transistor 104 is rendered non-conductive immediately in response to an external digital signal. In this situation, since the time constant circuit composed of the resistor 203 and the capacitor 204 is inserted between the non-inverting input terminal of the error amplifier 107 and the reference voltage circuit, a voltage of the non-inverting input terminal of the error amplifier 107 is gradually decreased to the first reference voltage.

If there exists no resistor 203, electric charges of the capacitor 204 are discharged as soon as the transistor 202 is rendered conductive, and a voltage of the non-inverting input terminal of the error amplifier 107 becomes identical with the first reference voltage immediately. In this situation, because the voltage of the output terminal VOUT is a voltage close to VDD, the error amplifier 107 determines that the voltage of the output terminal VOUT is excessively high in the level, and performs a control so that the transistor 101 is rendered conductive. When the transistor 101 is rendered conductive, a current flows from the output terminal VOUT toward a ground (GND). When it is assumed that the inductance value of the inductor 102 is L, and the voltage value of the output terminal VOUT is VOUT, an inclination of the current change at that time is VOUT/L. When the inclination is multiplied by a conduction time t [s] of the transistor 101, the change rate of the current in the inductor 102 during the conduction time t [s] can be calculated. In general, the inductor has the characteristic that the inductance value is rapidly reduced when a current that exceeds a permissible current value flows in the inductor. This phenomenon is generally called "magnetic saturation". A rapid reduction of the inductance value which is attributable to the magnetic saturation occurs after an elapse of a given time after the transistor 101 is rendered conductive, so the operation of returning from the bypass state to the normal state is conducted. When the transistor 101 is first rendered conductive, a large current flows from the output terminal VOUT toward the GND via the transistor 101, and electric charges that are stored in the capacitor 103 are discharged at a stretch. Because electric charges from the capacitor 103 are conducted in a short time, the voltage is further greatly lower than VOUT=α×VREF which is a voltage value of the output terminal VOUT in the normal state.

Therefore, a configuration is made in such a manner that the electric charges in the capacitor 204 are gently discharged by the provision of the resistor 203, and the voltage at the non-inverting input terminal of the error amplifier 107 is lowered down to the first reference circuit. The voltage value at the output terminal VOUT is determined through the control of the error amplifier 107 from the moment where the transistor is brought into the normal state, with the result that the voltage of the output terminal VOUT is also gradually decreased to a given voltage from the VDD.

Also, since the resistor 203 and the capacitor 204 each function as a low pass filter that is inserted to the input of the error amplifier 107 in the normal state, there are advantages in that the rapid voltage variation of the first reference voltage is suppressed, thereby reducing ringing that occurs at the output terminal VOUT when the voltage of the first reference voltage is varied.

What is claimed is:

1. A switching regulator, comprising:
    a voltage-dividing resistor for dividing a voltage outputted to an output terminal;
    an error amplifier for comparing a voltage outputted by the voltage-dividing resistor with a reference voltage;
    a chopping wave generator circuit for generating a chopping wave;
    a control circuit for inputting an output of the error amplifier and the chopping wave;
    a p-type MOS transistor and an n-type MOS transistor controlled according to an output of the control circuit and connected in series between a power supply and a ground; and
    a bypass transistor connected between the power supply and the output terminal,
    wherein a circuit for generating the reference voltage comprises:
    a first reference voltage circuit;
    a first switching means for connecting the first reference voltage circuit to the error amplifier in inversion synchronism with the bypass transistor;
    a time constant circuit disposed between the first switch means and the error amplifier;
    a second reference voltage circuit; and
    a second switch means for connecting the second reference voltage circuit to the error amplifier in synchronism with the bypass transistor.

2. A switching regulator control circuit according to claim 1, wherein:
    a voltage of the first reference voltage circuit is lower than a voltage of the second reference voltage circuit; and
    an input voltage of the error amplifier is gradually decreased by the time constant circuit when the first switch means is rendered conductive.

3. A switching regulator control circuit according to claim 1, wherein a voltage of the second reference voltage circuit is set so that the p-type MOS transistor connected to the power supply is rendered conductive in a state where the bypass transistor is in a conductive condition.

4. A switching regulator, comprising:
    the switching regulator control circuit according to claim 1; and
    an inductor and a capacitor which constitute an output smoothing circuit connected between a node of the p-type MOS transistor and the n-type MOS transistor, and the output terminal.

* * * * *